(12) United States Patent
Schuetz et al.

(10) Patent No.: US 10,164,712 B2
(45) Date of Patent: Dec. 25, 2018

(54) PHASED-ARRAY RADIO FREQUENCY RECEIVER

(71) Applicant: Phase Sensitive Innovations, Inc., Newark, DE (US)

(72) Inventors: Chris Schuetz, Avondale, PA (US); Janusz Murakowski, Bear, DE (US); Garrett Schneider, New Castle, DE (US); Shouyuan Shi, Newark, DE (US); Dennis Prather, Newark, DE (US)

(73) Assignee: Phase Sensitive Innovations, Inc., Newark, DE (US)

( * ) Notice: Subject to any disclaimer, the term of this patent is extended or adjusted under 35 U.S.C. 154(b) by 0 days.

(21) Appl. No.: 15/790,281

(22) Filed: Oct. 23, 2017

(65) Prior Publication Data
US 2018/0062752 A1    Mar. 1, 2018

Related U.S. Application Data

(63) Continuation of application No. 15/370,035, filed on Dec. 6, 2016, now Pat. No. 9,800,346, which is a continuation of application No. 14/791,351, filed on Jul. 3, 2015, now Pat. No. 9,525,489.

(60) Provisional application No. 62/020,627, filed on Jul. 3, 2014.

(51) Int. Cl.
| H04B 10/00 | (2013.01) |
| H04B 10/516 | (2013.01) |
| H04B 10/2575 | (2013.01) |
| H04B 1/16 | (2006.01) |
| H04B 10/11 | (2013.01) |

(Continued)

(52) U.S. Cl.
CPC ....... *H04B 10/5165* (2013.01); *H01Q 3/2676* (2013.01); *H04B 1/16* (2013.01); *H04B 10/11* (2013.01); *H04B 10/25759* (2013.01); *H04B 10/64* (2013.01); *H04B 2210/006* (2013.01)

(58) Field of Classification Search
CPC .... H01Q 3/2676; H04B 1/1027; H04B 10/64; H04B 10/25759; H04B 10/5165; H04B 1/16; H04B 10/11; G02F 2/002
USPC .......................................................... 455/132
See application file for complete search history.

(56) References Cited

U.S. PATENT DOCUMENTS

| 5,274,381 A | 12/1993 | Riza |
| 6,091,523 A | 7/2000 | Brandsetter |
| 2006/0145920 A1 | 7/2006 | Stephens |

(Continued)

OTHER PUBLICATIONS

PCT Search Report dated Sep. 30, 2015 for PCT/US15/39157.

(Continued)

*Primary Examiner* — Tesfaldet Bocure
(74) *Attorney, Agent, or Firm* — Muir Patent Law, PLLC

(57) ABSTRACT

A method of RF signal processing comprises receiving an incoming RF signal at each of a plurality of antenna elements that are arranged in a first pattern. The received RF signals from each of the plurality of antenna elements are modulated onto an optical carrier to generate a plurality of modulated signals that each have at least one sideband. The modulated signals are directed along a corresponding plurality of optical channels with outputs arranged in a second pattern corresponding to the first pattern. A composite optical signal is formed using light emanating from the outputs of the plurality of optical channels. Non-spatial information contained in at least one of the received RF signals is extracted from the composite signal.

26 Claims, 9 Drawing Sheets

(51) Int. Cl.
   *H04B 10/64*      (2013.01)
   *H01Q 3/26*       (2006.01)

(56) References Cited

U.S. PATENT DOCUMENTS

2010/0221015 A1   9/2010   Williams
2011/0073772 A1   3/2011   Schuetz et al.

OTHER PUBLICATIONS

Overmiller et al, "Ultrabroadband Phased-array Radio Frequency (RF) Receivers based on optical techniques," Terahertz, RF, Millimeter, and Submillimeterr-Wave Technology and Application VII, Proc. of SPIE vol. 8985, 89850U 2014.
Blanchard P M et al: Coherent Optical Beam Forming with Passive Millimeter-Wave Arrays, Journal of Lightwave Technology, IEEE Service Center, New York, NY, US, vol. 17, No. 3, Mar. 1, 1999 (Mar. 1. 1999), XP011029361, ISSN: 0733-8724.
Supplementary European Search Report for application EP 15 81 5384 dated Apr. 26, 2018.

PHASED-ARRAY RADIO FREQUENCY RECEIVER

CROSS-REFERENCE TO RELATED APPLICATION

This application is a continuation of U.S. patent application Ser. No. 15/370,035 filed on Dec. 6, 2016, issued as U.S. Pat. No. 9,800,346, which is a continuation of U.S. patent application Ser. No. 14/791,351 filed on Jul. 3, 2015, now issued as U.S. Pat. No. 9,525,489, which claims priority to Provisional Patent Application No. 62/020,627, the contents of each of which are hereby incorporated by reference in their entirety.

BACKGROUND

The disclosure relates generally to radio frequency (RF) receivers used to receive and demodulate radio signals, and more specifically to RF receivers that upconvert signals from RF to optical for signal processing.

Conventional RF receivers are limited in dynamic range by spurious intermixing of signals and/or jamming, either intentional or unintentional.

SUMMARY

Exemplary embodiments provide methods and apparatus for signal processing of RF signals received by an array of antenna elements. Methods of RF signal processing comprise receiving an incoming RF signal at each of a plurality of antenna elements that are arranged in a first pattern. The received RF signals from each of the plurality of antenna elements are modulated onto an optical carrier to generate a plurality of modulated signals. Each modulated signal has at least one sideband, which may contain information to be recovered or extracted through further processing.

According to aspects of various embodiments, each of the plurality of modulated signals is directed along a corresponding one of a plurality of optical channels, which may for example be optical fibers. Each of the optical channels has an output, and the plurality of channel outputs is arranged in a second pattern that corresponds to the pattern of the antenna elements. The plurality of outputs of the optical channels may emanate light to a free space, or to some other optical channel, in which the emanated light forms a composite optical signal. Information in one or more of the received RF signals, which may include non-spatial information, such as, for example, data carried by or encoded onto the RF signal, may be extracted from the composite optical signal.

In some embodiments an image may be formed based on the received RF signals. A sideband of each of the modulated signals may be isolated, for example by a band-pass filter. Extracting information from the composite optical signal may include directing the composite signal onto a cueing detector and/or onto a signal detector. Extracting information may include identifying at least one position of an incoming RF signal, which may include identifying a signal position within an interference pattern. The angle of arrival of RF signals may be determined in real time directly from the composite optical signal.

In various embodiments there may be compensation for phase shift in one or more of the optically modulated RF signals. Compensating for phase shift may include adjusting an electro-optic modulator.

According to aspects of various embodiments, RF receivers comprise a phased-array antenna that include a plurality of antenna elements and a corresponding plurality of electro-optic modulators. The antenna elements are arranged in a first pattern and configured to receive RF signals from at least one source. The modulators are configured to modulate an optical carrier with a received RF signal to generate a plurality of modulated optical signals. A plurality of optical channels carry the plurality of modulated optical signals and emanate them at a corresponding plurality of channel outputs. The optical channel outputs may be arranged in a second pattern that corresponds to the first pattern of the antenna elements.

In various embodiments, RF receivers include a composite signal channel, which may for example be a free space, adjacent the plurality of outputs of the plurality of optical channels. The composite signal channel is configured to receive the plurality of modulated optical signals to allow for generating or forming a composite optical signal. A detector, for example a photodiode, may be configured to receive at least a portion of the composite optical signal and to extract non-spatial information from a received RF signal.

In some embodiments an RF receiver may include a filter configured to isolate a sideband from at least one modulated optical signal. The filter may be located within the composite signal channel.

According to aspects of various embodiments the detector may be configured to identify a signal position from the composite optical signal. The signal position may correlate with a spatial position of a source of one or more RF signals received by the antenna array. The detector may be configured to detect a received RF signal from at least one source based on the identified signal position. The detector may include a cueing detector configured to use the composite optical signal to identify a signal position that corresponds to a spatial position of an RF source.

According to other aspects, the RF receiver may further include a phase compensation detector configured to compensate for phase shifts in the modulated optical signals. The receiver may further include one or more additional detectors configured to extract non-spatial information from a received RF signal, and include one or more spatial light modulators to direct at least a portion of the composite optical signal onto the additional detectors. An additional detector may include at least one photodetector.

According to yet other aspects of various embodiments, methods of RF signal processing may include receiving an incoming RF signal at each of the plurality of antenna elements, converting the incoming RF signal at each of the plurality antenna elements to a corresponding plurality of optical signals, directing the optical signals along a corresponding plurality of optical channels, forming a composite optical signal using optical signals, detecting a spatial position of a plurality of RF sources from the composite optical signal, and identifying a non-spatial attribute of at least one of the plurality of RF sources based on the composite optical signal. The antenna elements may be arranged in a first pattern and the outputs of the plurality of optical channels may be arranged in a second pattern that corresponds to the first pattern. Converting the incoming RF signals may include optically modulating at least one optical signal with the incoming RF signals to generate a plurality of modulated optical signals.

Yet still other aspects include forming an image based on the received RF signals. Detecting a spatial position of an RF source may further employ spatial filtering, which may, for example, include nulling an optical signal that corresponds to an RF signal received by the antenna array. Some embodiments may include optically steering the composite optical signal, for example using optical phase shifting.

In some embodiments, identifying a non-spatial attribute of at least one of the plurality of RF sources may include receiving a portion of the composite optical signal with a photodiode. A portion of the composite optical signal may be directed to the photodiode through use of beam-splitting of the composite optical signal. The composite optical signal may be filtered with a spatial light modulator. Identifying a non-spatial attribute of at least one of the plurality of RF sources may comprise heterodyning at least a portion of the composite optical signal to generate a heterodyned signal and directing the heterodyned signal onto a photodetector.

Yet still other embodiments provide methods and apparatus for recovering RF signals from sources and/or extracting information from such RF signals. An RF signal and/or information contained in an RF signal may be recovered or extracted by sampling an incoming RF signal from each source with a phased-array antenna including antenna elements arranged in a first pattern. Each sampled RF signal is optically modulated onto an optical carrier, the optical modulation resulting in a modulated signal comprising sidebands flanking the optical carrier. Each of the modulated signals is directed along optical channels, such as optical fibers. Each optical channel has an output for passing the corresponding modulated signal to a composite signal channel, such as a free space. The channel outputs are arranged in a second pattern that corresponds to the first pattern. The optical signals may be filtered to isolate one of the sidebands, and an interference pattern formed from the isolated sidebands originating at the optical channel (e.g., fiber) outputs and propagating in composite signal channel (e.g., free space). The RF signal may be recovered from each source and/or information from the RF signal may be extracted by identifying a signal position within the interference pattern corresponding to a spatial position of each source and detecting the corresponding RF signal.

BRIEF DESCRIPTION OF THE DRAWINGS

The present disclosure now will be described more fully with reference to the accompanying drawings, in which various embodiments are shown. The invention may, however, be embodied in many different forms and should not be construed as limited to the exemplary embodiments. In the drawings, features may be exaggerated for clarity, and lines without arrows may represent bidirectional exchange between components. Like numbers refer to like elements throughout the drawings, which include the following.

DETAILED DESCRIPTION OF THE EMBODIMENTS

Figure 1:
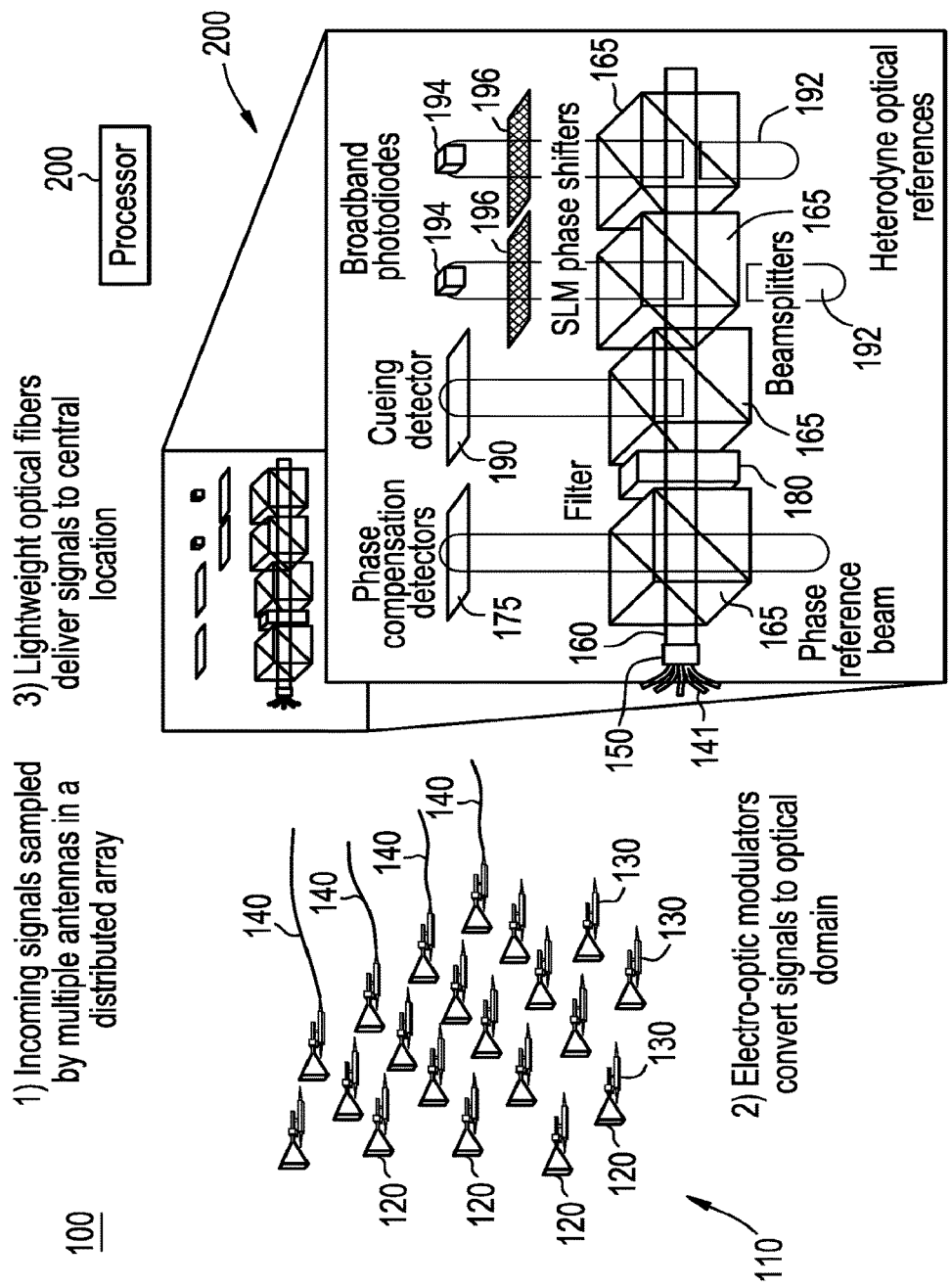
FIG. 1 is an illustration of an RF receiver in accordance with aspects of the invention.

Various exemplary embodiments will be described more fully with reference to the accompanying drawings. The inventions as described and claimed herein may, however, be embodied in many different forms and should not be construed as limited to the embodiments set forth herein.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept disclosure and claims. As used herein, the singular forms "a," "an" and "the" are intended to include the plural forms as well, unless the context clearly indicates otherwise It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the relevant art and will not be interpreted in an idealized or overly format sense unless expressly so defined herein.

Hereinafter, example embodiments will be explained in detail with reference to the accompanying drawings. The same reference numerals will be used to refer to the same elements throughout the drawings and detailed description about the same elements will be omitted in order to avoid redundancy.

Aspects of the disclosure are related to devices and associated methods for improving the linear dynamic range and tolerance for jamming in a wideband radio-frequency (RF) phased-array receiver. By separating signal sources spatially prior to detection/digitization, undesirable nonlinear signal mixing can be reduced or eliminated. Such mixing in conventional receivers can produce spurious intermixing products that limit the receiver's dynamic range, because they cannot be distinguished from genuine signals.

An additional advantage of the embodiments is the ability to determine a signal's angle of arrival (AoA) in real time. This is unlike conventional receivers where AoA is determined by a cumbersome computation of the cross-correlations between signals from multiple antenna elements after detection and digitization, which result in nonlinearities and latency that are detrimental to receiver performance.

Aspects of the embodiments provide a signal detection mechanism wherein RF signals are upconverted by fiber-coupled optical phase modulators driven by the antenna elements of a phased array. The conversion results in sidebands on an optical carrier wave supplied by a laser. These optical sidebands are substantially proportional in power to the RF power incident into each antenna element, and also preserve the phase carried by the incident RF signal. This essential property of RF upconversion allows the optical sidebands to be used to reconstruct an image of the RF energy in the scene. Dynamic range is improved and resistance to jamming is increased by processing in the optical domain, because energy from separate sources is separated spatially before being detected electrically, e.g., by a photodiode or a pixel in an optical camera.

A receiver 100 in accordance with aspects of the invention is depicted in FIG. 1. The illustrated receiver 100 is sparse-array receiver. The receiver 100 includes a processor 200 coupled to the various components within the receiver to implement the functionality described herein. Variations of suitable processors for use in the receiver 100 will be understood by one of skill in the art from the description herein.

Figure 2:
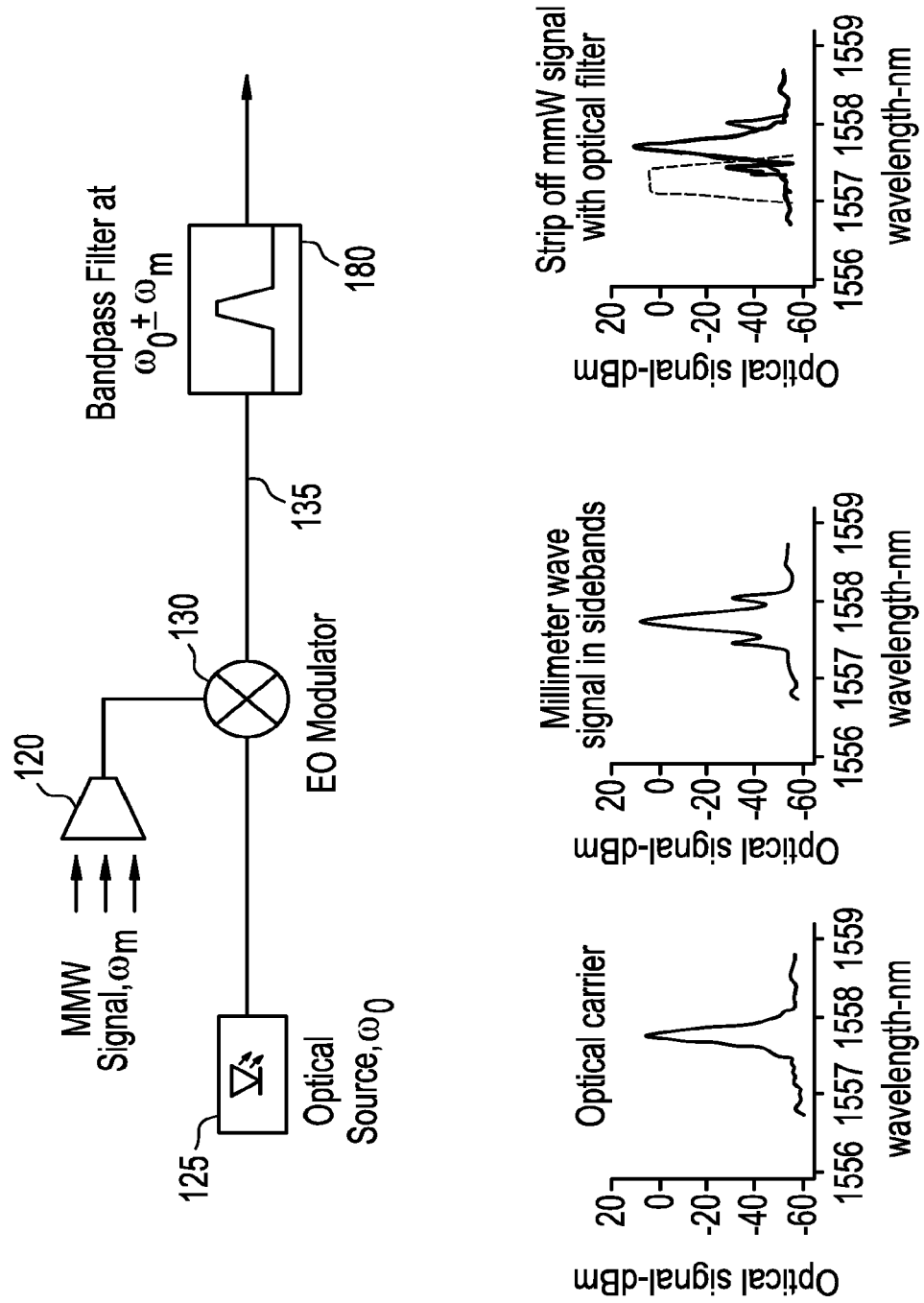
FIG. 2 is a block diagram of components for use within the RF receiver of FIG. 1 (and corresponding graphs of signals output by the optical source, electro-optic modulator and band-pass filter components) in accordance with aspects of the invention.

A phase-array antenna 110, e.g., a sparse array of M antenna elements 120 arranged in a predetermined pattern as shown in the example of FIG. 1, receives RF signals from an external source. While the antenna elements 120 shown in FIG. 1 are horn antenna, those of skill in the art understand that a variety of antenna means may be used. RF signals sampled at the antenna elements 120 are used to modulate a laser beam split M ways. An electro-optic (EO) modulator 130 is coupled to each of the antenna elements 120 and receives a branch of the split laser beam that it uses to convert the RF energy received at each antenna element 120 to the optical domain. It does so by modulating the optical (carrier) beam produced by the laser. The time-variant modulation manifests itself in the frequency domain as a set of sidebands flanking the original carrier frequency (or wavelength), at which the source laser operates, as illustrated in FIG. 2, which is discussed in more detail below. As a result, the energy radiated in the RF domain appears in the optical domain as sidebands of the carrier frequency. This up-conversion of the RF signal into optical domain is coherent in the sense that all the phase and amplitude information present in RF is preserved in the optical sidebands. This property of coherence preservation in optical up-conversion allows the recovery of the RF-signal angle of arrival using optical means.

Figure 3:
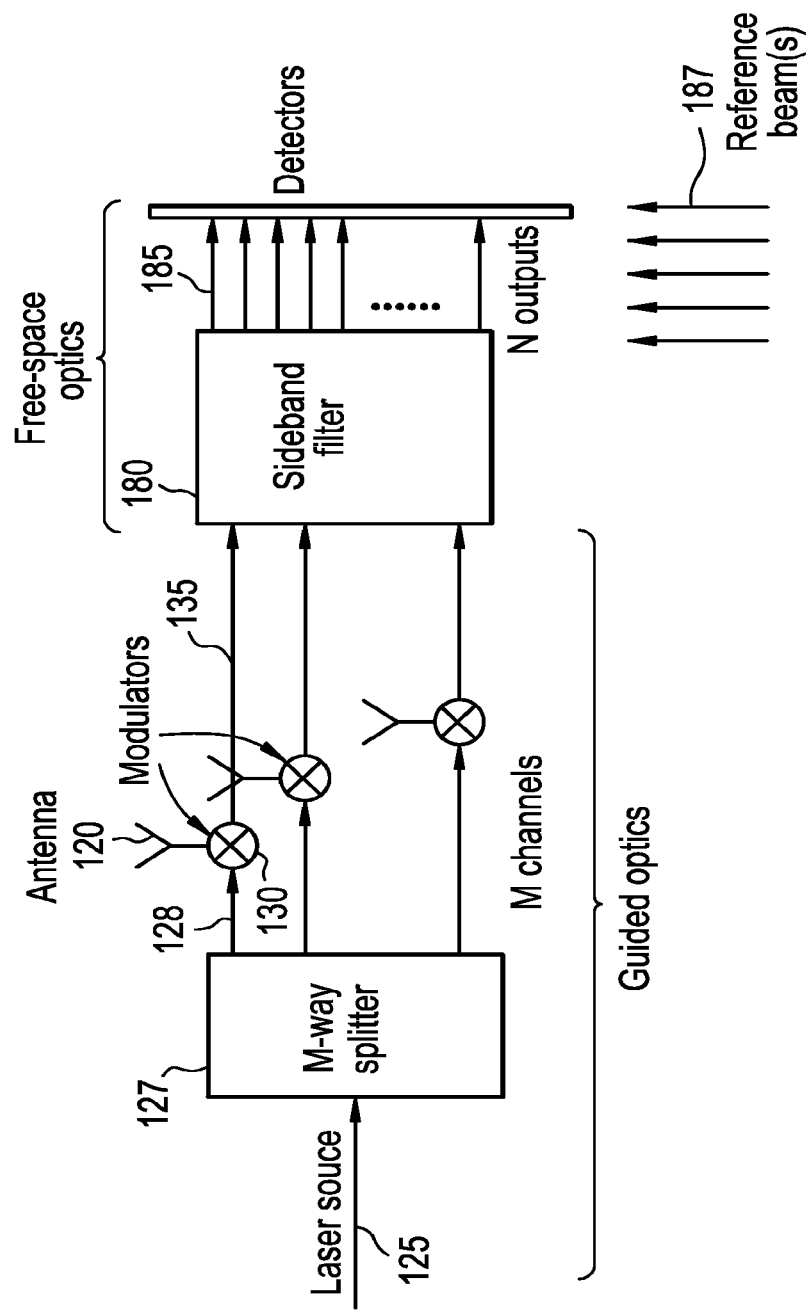
FIG. 3 is a block diagram of additional components for use within the RF receiver FIG. 1 in accordance with aspects of the invention.
Figure 4:
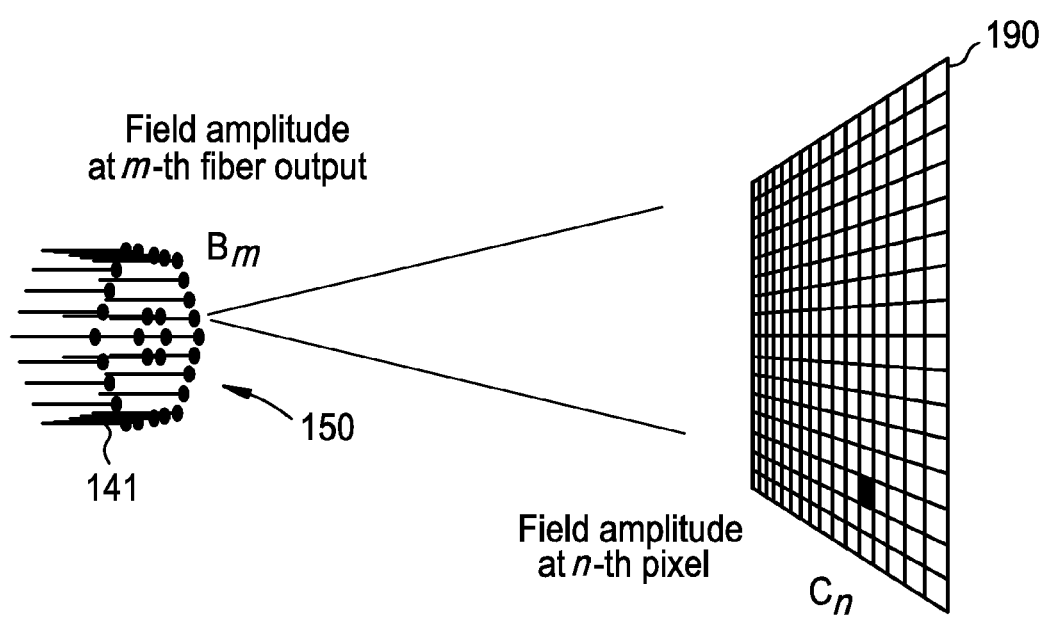
FIG. 4 is an illustration to aid in defining various quantities appearing in the explanation of the operation of the invention.

Returning to FIG. 1, the modulated optical beams containing the laser carrier wavelength and the sidebands with imprinted RF signal are conveyed by optical fibers 140 to a lenslet array 150 coupled to the outputs 141 of the fibers 140 that are arranged in a second pattern that mimics or corresponds to the first pattern of the array of the RF antennas, at a reduced scale. FIG. 4 illustrates the output ends of the optical fibers 140 arranged in a pattern that corresponds to the pattern of the antenna elements 120 of FIG. 1. As illustrated in FIG. 4, from the output 141 of the optical fibers 140 at the lenslet array 150 on, that beams propagate in free space, no longer guided by the optical fibers. While the embodiment of FIG. 1 shows conventional optical fibers 140 between the electro-optic modulators 130 and the processor 200, those of skill in the art will appreciate that other optical waveguides or channels may also or instead be used (as illustrated in FIG. 3). Similarly, while FIGS. 3 and 4 illustrate the use of a free space in the processor 200 as a channel for forming a composite optical signal from light emanating from the outputs of the optical fibers 140, those skilled in the art will appreciate that other optical channels can be used for forming a composite optical signal.

Again referring back to FIG. 1, the individual beams propagate in free space from the outputs 141 of fibers 140 at the lenslet array 150, which allows the individual beams to interfere with one-another where they overlap to form a combined or composite beam 160. Part of the combined beam 160 is split off with a beam-splitter 165, mixed with a reference beam 170, and sent to an array of detectors 175 (phase-compensation detectors in FIG. 1) in order to detect, and allow for the compensation of, optical phase variation originating in the individual fibers 140 due to environmental conditions such as vibrations and acoustics. This ensures that the resulting image corresponds to spatial distribution of RF sources in the scene as opposed to vibrating fibers. A band-pass optical filter 180, see FIG. 1, strips off the carrier wavelength and allows only one of the sidebands through, FIG. 2. The overlapping beams that now carry only a single sideband are projected onto a cueing detector 190, e.g., a charge coupled device (CCD) array, where they interfere to form a representation of the RF angle of arrival in the optical domain. In other words, the optical image formed by the overlapping beams on the cueing detector 190 may substantially be a replica of the RF scene as seen by the sparse antenna array 110.

FIG. 2 illustrates the use of an optical filter 180 to recover or isolate an optical sideband that corresponds to a received RF signal, which may for example be a millimeter wave (MMW) signal having a frequency $\omega_m$. As shown in the graphs of FIG. 2, the received RF signal(s) from antenna element(s) 120 modulate with an optical carrier signal (source) 125 operating at a frequency $\omega_0$ (illustratively at a wavelength between 1557 and 1558 nm). The output 135 of modulator 130 includes an optical analog of the MMW signal in sidebands of the optical carrier as shown in the middle graph. An optical band-pass filter 180 tuned to $\omega_0+\omega_m$ $\omega_0-\omega_m$ strips off (isolates) the optical representation of the received MMW signal(s) from the carrier.

FIG. 3 depicts the configuration of a receiver 100 with an emphasis on the optical layer. The single laser source 125 is split M ways by a splitter 127 and the beams 128 are routed through modulators 130 coupled to antennas 120 capturing the RF radiation. The (optical) outputs 135 of the modulators 130 are filtered to allow only a single sideband corresponding to the captured RF radiation to pass, for example using a filter 180 as described with FIG. 2. The free-space interference of the optical beams 185 output from filter 180 among the M different channels yields a pattern measured with detectors, as discussed in more detail below. Mixing the interference pattern produced by the outputs 185 with reference beam(s) 187 allows for the extraction of information carried in the optical beam(s) modulated with incoming RF signal(s).

Note that FIGS. 1 and 3 depicts the filter 180 positioned in the free-space portion of the receiver 100 downstream of the lenslet array 150. In alternative embodiments, the filter can be placed anywhere between the modulators 130 and the cueing detector 190 to enable reconstruction of the RF-source position in the optical domain. Furthermore, in some embodiments, especially for frequencies lower than ~5 GHz, a Mach-Zehnder modulator (MZM) may be used for filter 180 to filter out the sideband energy from the optical carrier energy. Such modulators can, under appropriate bias conditions, interferometrically suppress the carrier while passing the (odd-ordered) sidebands, thereby suppressing the carrier in a frequency-independent manner.

The cueing detector 190 of FIG. 1 may be an array of photo-detectors such as those of a charged coupled device (CCD) or contact image sensor or CMOS image sensor, which in some embodiments may not be able to decode information present in the RF signals received by the antenna array 110 with the same performance as high-speed photodiodes. In some embodiments, to extract or recover information encoded in the RF signals input by the antenna elements 120, the composite optical beam output from filter 180 is further split with additional beam-splitters 165, and combined with reference laser beams 192 for heterodyne detection at fast photodiodes 194 as illustrated in FIG. 1. A few examples of non-spatial information encoded into an RF signal that may be detected by photodiodes 194 include amplitude, phase, and/or frequency modulation of an RF carrier with information-bearing signal. The information-bearing modulating signal may be analog or digital in nature. In the latter case, the information may be contained in frequency-division multiplexed, time-division multiplexed, or code division multiple access signals (FDM, TDM or CDMA respectively; using telecommunication examples for more specificity for each, e.g., OFDM, GSM, or WCDMA signals). For example, each photodiode 194 may receive an OFDM signal comprising multiple carrier signals that are orthogonal to each other. Each of the multiple carrier signals may be appropriately demodulated (e.g., baseband) to extract data (e.g., a digital data comprising binary bits of 0's and 1's). Each OFDM signal received by each photodiode 194 may comprise multiple channels of data each associated with a different transmission (e.g., each associated with a different audio signal or different video signal). As is known, a channel of digital data need not be carried by a single carrier but may be spread across multiple ones of these carriers (e.g., via frequency hopping or interleaving). The RF carriers of the OFDM signals simultaneously transmitted by the RF sources and received by each photodiode 194 may have same frequencies; interference amongst the simultaneously received OFDM signals may be avoided due to the spatial separation of the RF sources. Each OFDM signal received and demodulated by each photodiode 194 may correspond to an OFDM RF signal transmitted by one or more of the RF sources and received by antennas 120 (e.g., in the millimeter wavelength RF range, or in a range of 3 to 300 GHz, or between 0.5 to 300 GHz, such as 0.5-110 GHz, or in the HF band of 3 to 30 MHz, or in VHF band of 30 to 300 MHz, or in UHF band of 300 MHz to 1 GHz). Thus, for example, antennas 120 may receive multiple OFDM signals each having multiple channels to carry multiple transmissions of digital data on multiple signal carriers, such as digital audio (e.g., MP3, MPEG), digital images digital video (e.g., MP4), data in TCP/IP format, etc. Optical conversion and processing (as described herein) may provide each of these OFDM signals emanating from different RF transmitters to a different corresponding photodiode as a converted optical signal. Although the above example describes transmission and receiving of one or more OFDM signals, other RF encoding/decoding schemes (as noted herein) may be utilized and processed in the optical domain in a similar manner. Spatial light modulator (SLM) phase shifters 196 ensure that the sources of RF radiation, detected as bright spots in the cueing detector 190, are imaged on the fast photodiodes 194 individually. In FIG. 1 two such fast photo-diodes 194 with the corresponding SLMs 196 are shown for illustration; they allow receiving signals from two distinct RF sources simultaneously. Increasing the number of photo-diodes 194 with the corresponding SLMs 196 and beam splitters 165 increases the number of received RF signals that can be processed simultaneously to extract or recover information.

In alternative embodiment, an array of suitably fast photo-detectors can be used in place of the relatively slow CCD in the cueing detector illustrated in FIG. 1. Upon mixing with optical references, such alternative detector array embodiments provide means for both spatial discrimination of the RF sources, and extracting information carried by the corresponding RF signals. In these alternative embodiments, the additional beam splitters 165, SLMs 196 and photo-diodes 194 shown in FIG. 1 are unnecessary.

Below, further details on the optical reconstruction of the RF scene are presented. To reconstruct the image of the RF scene in the optical domain, the (optical) outputs of the modulators 130 are carried in optical fibers 140 to a lenslet array 150 that mimics the spatial distribution of the antennas 120. The output beams are then allowed to interfere in free space (or other suitable channel for forming a composite optical signal), and the interference pattern corresponding to the original RF scene is captured by an array of optical sensors such as a CCD chip embodiment of cueing detector 190. In the absence of spectral filtering, the image reconstruction process can be expressed as follows:

$$C_n = \frac{1}{\sqrt{N}} \sum_{m=0}^{M-1} B_m e^{i(\omega t + \theta_{nm} + \varphi_m)} + c.c. \tag{1}$$

where, with reference to FIG. 4, $B_m$ is the amplitude of the field at the output of the m-th fiber, $C_n$ is the electric field (of light) at the n-th pixel of the CCD (in the absence of spectral filtering), $\omega$ is the optical frequency, $\varphi_m$ is the (RF-modulated) phase of the optical beam in the m-th fiber, and $\theta_{nm}$ is the phase the optical beam picks up as it propagates in free space from m-th to n-th pixel; it is assumed that there are M optical fibers, N sensing elements in the CCD array, and that the intensity of light coming out of each fiber is evenly distributed among the N sensors of the CCD; c.c. signifies the presence of complex conjugate of the first term that makes the electric field a real number. As noted, the beams output by the optical fibers 140 are allowed to interfere in an interference providing space (a fiberless space). Such an interference space may be transparent and may comprise a vacuum, air, a gas other than air, a liquid or a solid (e.g., a lens or a slab waveguide).

For the purpose of the following analysis, the RF (e.g., mmW) scene is divided into discrete RF emitters enumerated with index k. The phase imposed on the optical carrier in the m-th channel by k-th RF emitter is $$S_k \cos(\Omega t + \varphi_{km}), \quad (2)$$

where $\Omega$ is the frequency of the RF signal, $S_k$ is the amplitude of the wave emitted by the k-th emitter, scaled by modulation efficiency and the distance from the aperture, and $\varphi_{km}$ is the phase picked up by the wave between the k-th emitter and the m-th antenna element of the array. The total phase in the m-th channel is obtained by adding contributions from all RF sources in the scene, i.e.

$$\varphi_m = \sum_k S_k \cos(\Omega t + \phi_{km}). \quad (3)$$

If the RF waves originating at different positions are uncorrelated, it can be shown that Eqs. (1), (2) and (3), in combination with spectral filtering that allows only one sideband through, yield the following average power detected at the n-th pixel of the CCD array $$P_n = \sum_{m,m'} e^{-ik_n(x_m - x_{m'})} \sum_k S_k^2 e^{iK_k(X_m - X_{m'})}. \quad (4)$$

Equation (4) has a form of a composition of Fourier and inverse-Fourier transformations, and therefore, it spatially reconstructs the positions of the RF sources present in the scene as bright spots on the CCD array. In Eq. (4), $K_k$ is the wave-vector of the RF wave associated with k-th source, $X_m$ is the position of the m-th antenna in the array, $x_m$ is the position of the m-th fiber in the array, and $k_n$ is the wave-vector of the optical wave-form produced by the fiber array that is collected by the n-th pixel in the CCD array.

The information of the positions of the sources of RF radiation obtained this way from the cueing detector 190 is then used in the SLM phase shifters 196 to project the regions of interest onto fast photo-detectors 194, which, with the help of a heterodyne optical reference 192, convert the modulated light back into RF for further processing.

Figure 9A:
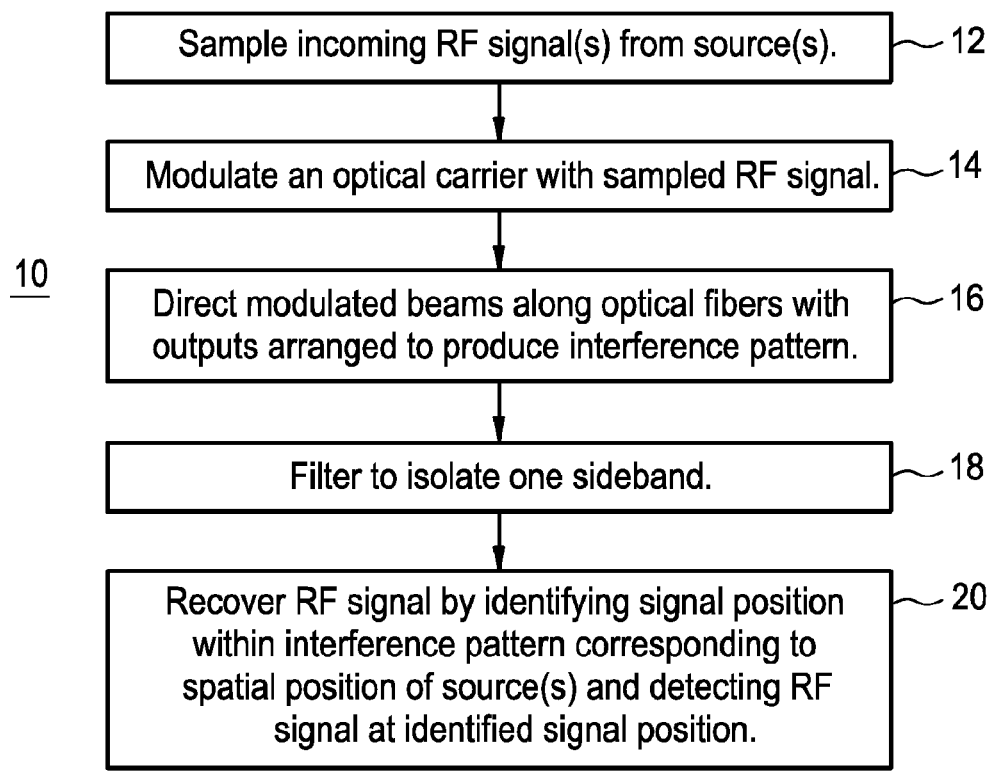
FIGS. 9A and 9B show flow chars of a method for recovering an RF signal in a radio-frequency phased-array receiver in accordance with aspects of the invention.

FIG. 9A depicts a flow chart 10 of steps for spatial discrimination of RF sources and the corresponding signal detection in a radio-frequency phased-array receiver according to aspects of the inventions. The steps of flow chart 10 may be performed using the receiver depicted in FIG. 11 as well as a wide variety of other embodiments that would be apparent to those of skill in the art.

At step 12, the incoming RF signal is received (or sampled, etc.), e.g., by a phased-array antenna. The incoming RF signal from each of at least one source may be sampled with a plurality of antenna elements in a phased-array antenna. The phased-array antenna may be arranged in a first pattern.

At step 14, an optical carrier is modulated with the received RF signal. An optical carrier may be modulated by each of the at least one RF signal received by each of the plurality of antenna elements with a corresponding electro-optic modulator. The optical modulation of the optical carrier with the RF signals results in a modulated optical beam comprising at least one sideband flanking the optical carrier.

At step 16, each of the modulated beams may be directed along an optical channel, e.g., an optical fiber. Each optical fiber has an output for passing its corresponding modulated signal to a composite signal channel, such as a free space, in which a composite optical signal will form from combined outputs. The outputs of the plurality of optical fibers may be arranged in a second pattern corresponding to the first pattern, wherein propagation of the optical beams from the outputs into free space forms an interference pattern.

At step 18, each of the RF-modulated optical signals is filtered to isolate one of the sidebands.

At step 20, information contained in at least one RF signal is recovered or extracted. The RF signal information may be recovered by identifying a signal position within the interference pattern corresponding to a spatial position of the source of the RF signal. Non-spatial information, such as information encoded onto the RF signal that corresponds to that signal position, may be detected or extracted from the corresponding modulated optical signal.

Figure 9B:
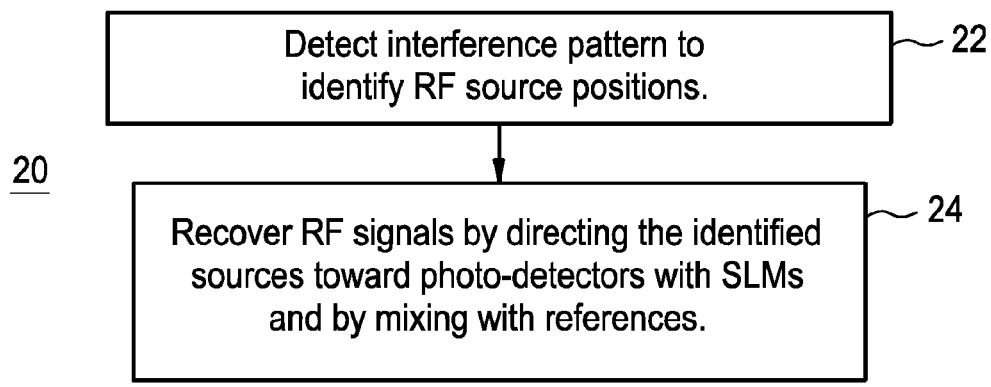

FIG. 9B depicts a flow chart 20 of steps detailing the process for the recovery or extraction of information of the RF signal(s). The steps of flow chart 20 may be performed using the receiver depicted in FIG. 1, although those of skill in the art will understand a variety of other embodiments are suitable for performing the steps.

At step 22, the signal positions are detected by a first detector. For example, the interference pattern may be directed onto a cueing detector to identify the signal positions where each identified signal position corresponds to the spatial position of an RF source.

At step 24, the non-spatial information of the RF signals is extracted or recovered from the corresponding modulated optical signals. The interference pattern may be directed onto a signal detector with a spatial-light-modulator, using the signal positions identified in step 22, to extract or recover the information from the RF signals from at least one source.

In another embodiment, the RF signal may be recovered by directing the interference pattern onto a signal detector that identifies the signal positions, where each identified signal position corresponds to the spatial position a source. The same signal detector additionally detects the RF signals from each of the at least one source at the identified signal positions within the interference pattern.

In preferred embodiments incorporating multiple high-speed photodetectors, each of the fast photodetectors receives power from only one element of the scene—from one RF source—while effectively suppressing all other sources that may be present. Below, issues related to such mapping are quantified, and expressed in terms of the enhancement of effective dynamic range.

Spatial filtering may be employed to improve effective dynamic range. The spatial separation of the RF radiation arriving from different directions prior to electronic processing provides means for suppressing unwanted (jamming) sources as long as they are not collocated with the region of interest. Such suppression is equivalent to effective enhancement of the dynamic range: the receiver is capable of detecting a weaker signal in the presence of a stronger source than would otherwise be possible in a conventional configuration.

Specifying certain functional characteristics of the receiver can quantify this enhancement. First is the number of independent elements, N, of the reproduced image of the RF scene. Essentially, N is equal to the field of view of the antenna array divided by the resolution. Another way to look at the number of independent elements is by using concepts developed by Claude Shannon in the context of telecommunications. The time-bandwidth product, which is equal to the dimension of the space of all possible messages that can be transmitted in a given channel over a certain bandwidth in a given time, plays a central role. The analogue of the time-bandwidth product in the case of imaging with a 2D aperture is the area-spatial-frequency-bandwidth product. To calculate spatial-frequency-bandwidth, the frequency (or wavelength) and the field of view are needed. The spatial frequency captured by the aperture is obtained by projecting the incident k-vector on the aperture plane. The higher the incidence angle at a given frequency, the higher the spatial frequency. Thus, for a square aperture and square field of view, ±θ in each direction, the spatial-frequency-bandwidth is $$\left[2\frac{v\sin(\theta)}{c}\right]^2, \tag{5}$$

where v is the frequency of the received RF signal, and c is the speed of light. Assuming a square aperture with side L, and the respective area $L^2$, the number of independent image elements is $$N = \left[2\frac{vL\sin(\theta)}{c}\right]^2. \tag{6}$$

Another concept required for the evaluation of the equivalent dynamic range enhancement is the diffraction efficiency η of the antenna array. In the language of diffractive optics, the diffraction efficiency measures the fraction of the overall received power that ends up in the desired location or direction In the context of the embodiments disclosed herein, it is useful to consider a distant point source illuminating the antenna array. On th imaging side, in the cueing detector, the point source becomes an image consisting of a spike at one location, and some increased background level elsewhere. In other words, in addition to the one desired image element, the point source also illuminates all other N−1 image elements to some extent. The ratio of the power received in the desired element to the total power received is the diffraction efficiency η.

The number of elements that can be realized on a given platform is limited to its maximum physical extent. As an example, for a source at 3 GHz the number of resolvable elements would be limited to approximately N=400 for a 1-meter aperture into a 2π steradian solid angle field of view. At 106 GHz, the same aperture affords N=500,000.

Figure 5:
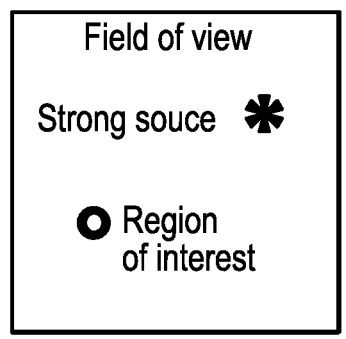
FIG. 5 is an illustration of an RF scene setup to illustrate calculating dynamic range enhancement in accordance with aspects of the invention.

To calculate the enhancement of the effective dynamic range, consider a case depicted in FIG. 5 where the signal of interest comes from the region of interest denoted as o in the presence of a strong source marked as *. As indicated above, the strong source, in addition to producing a bright spot in the respective image location, will deposit energy in all other locations including the region of interest. Assuming that the total power coming from the strong source is P*, the power delivered to point * is ηP*. Therefore, the total power delivered to all image elements excluding * is (1−η)P*. Assuming that the power from the strong source that misses the mark is evenly distributed among the remaining N−1 elements, the region of interest o receives $$\frac{1-\eta}{N-1}P^* \tag{7}$$

as its share. At the same time, fraction η of power $P^o$ originating at the region of interest is deposited at the point corresponding to o. Therefore, the ratio of the desired power to the undesired power at the observed region of interest is $$\frac{\eta}{1-\eta}(N-1)\frac{P^o}{P^*}. \tag{8}$$

In the absence of spatial filtering, each antenna element of the array receives the total power originating at the entire field of view and passes all of it for electronic processing. Therefore, the ratio of the desired power to the undesired power that need to be discriminated is $$\frac{P^o}{P^*}. \tag{9}$$

By comparing expressions (8) and (9), the enhancement of the desired to the undesired power ratio that needs to be processed electronically is obtained as $$\frac{\eta}{1-\eta}(N-1). \tag{10}$$

Formula (10) may be interpreted as the effective enhancement of the dynamic range of the receiver. Such interpretation is justified by the way it was derived as the ratio of ratios of desired to undesired powers that need to be processed electronically. In other words, all else being equal, the receiver can tolerate the level of 'jamming' power increased by a factor η(N−1)/(1−η) and deliver the same performance in terms of detecting the desired signal as a conventional receiver configuration.

Figure 6:
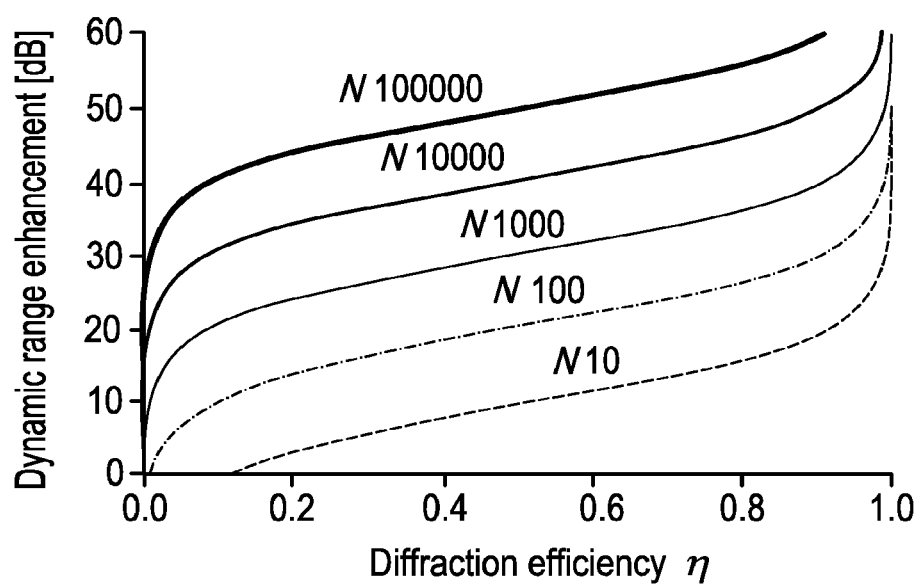
FIG. 6 is a graph illustrating dynamic range enhancement as a function of diffraction efficiency in a spatially-discriminating sparse-array receiver for different numbers of independent image elements in accordance with aspects of the invention.

The dependence of the dynamic range enhancement as a function of diffraction efficiency for several different values of N is shown in FIG. 6. Note that the minimum enhancement is always 0 dB. This can be ascertained by noting that the minimum diffraction efficiency occurs when the incoming power is evenly spread among all N elements of the RF signals captured by the antenna array, i.e. η=1/N. Substituting this value to expression (10) yields 1, or, equivalently 0 dB. On the other hand, at high diffraction efficiency approaching 1, which corresponds to fully populated antenna arrays, the dynamic-range enhancement is divergent—it tends to infinity. Such behavior may intuitively be understood by noting that at high diffraction efficiency, negligible amounts of power leak to image elements that do not correspond to the position of the source, i.e., the region of interest o receives negligible power from source *. As a result of this almost ideal spatial filtering, the ability to jam the receiver by using a spatially separated strong source may be effectively eliminated.

An assumption of this analysis is that the power from the unwanted source is evenly distributed across the other elements of the array. In actuality, this distribution will be non-uniform, with nulls that can be adjusted to further reduce contributions from unwanted sources. Thus, using smart nulling techniques that are known to those of skill in the art, embodiments can provide significant improvement in dynamic range beyond the nominal the results described above.

Tests to demonstrate aspects of embodiments of the inventions have been performed, as discussed below.

Figure 7:
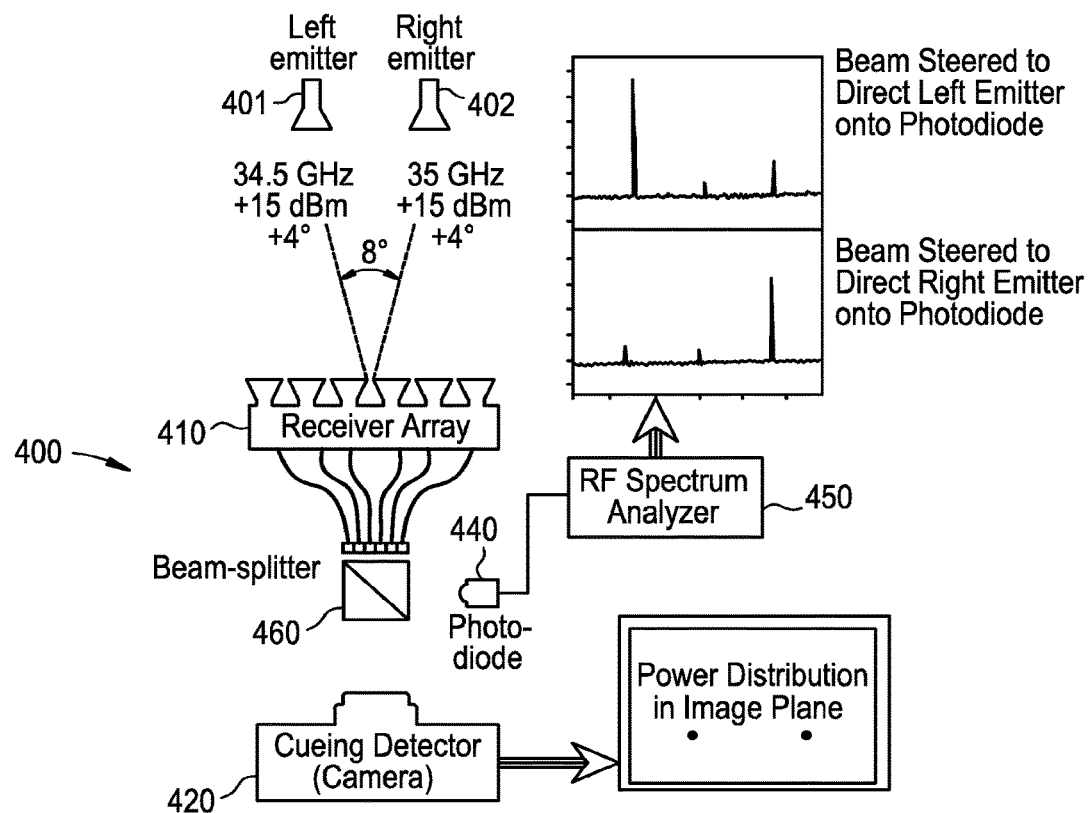
FIG. 7 is a block diagram and corresponding results of an experimental demonstration of an imaging receiver used to spatially distinguish between two active signal emitters in accordance with aspects of the invention.

FIG. 7 depicts a schematic illustration and representative preliminary data obtained from a test configuration 400 to demonstrate spatially separating signals via optical upconversion and imaging prior to electronic detection. An array of receivers 410 comprising optical modulators (130) driven by antennas (120) was used to obtain an image of two ~35-GHz emitters (34.5-GHz left emitter 401 and 35.0-GHz right emitter 402). The system used an image reconstruction in the optical domain by the camera 420, in parallel with optical phase steering by applying DC bias to optical modulators (130 in FIGS. 1 and 2) to direct energy from the emitters onto a high-speed photodetector 440. The photodetector 440's output spectra were measured by an RF spectrum analyzer 450 and are shown at the top right of FIG. 7. The image obtained by the system is shown at the lower right of FIG. 7, and consists of two bright spots. After upconversion, but before detection by the camera, a beam-splitter 460 was used to separate a portion of the optical energy and direct it to the high-speed photodetector 440. Optical phase shifting in each of the modulators 130 was used to steer the image of either emitter to the photodetector. Electrical spectrum-analyzer traces of the detector output are shown in the upper right region of FIG. 7. The top spectrum is for the case when the image was steered to direct the energy of the left emitter 401 operating at 34.5 GHz onto the photodetector 440 whereas the bottom spectrum corresponds to steering the image so as to direct the energy of the right emitter 402 operating at 35.0 GHz onto the photodetector 440. The two sources 401, 402 operated at the same power levels for the capture of the two spectra. The difference in the two spectra, in particular the difference in the detected relative intensities between the two different sources, is the result of spatial discrimination between the two sources as afforded by the test embodiment which implemented aspects of the inventions.

Figure 8:
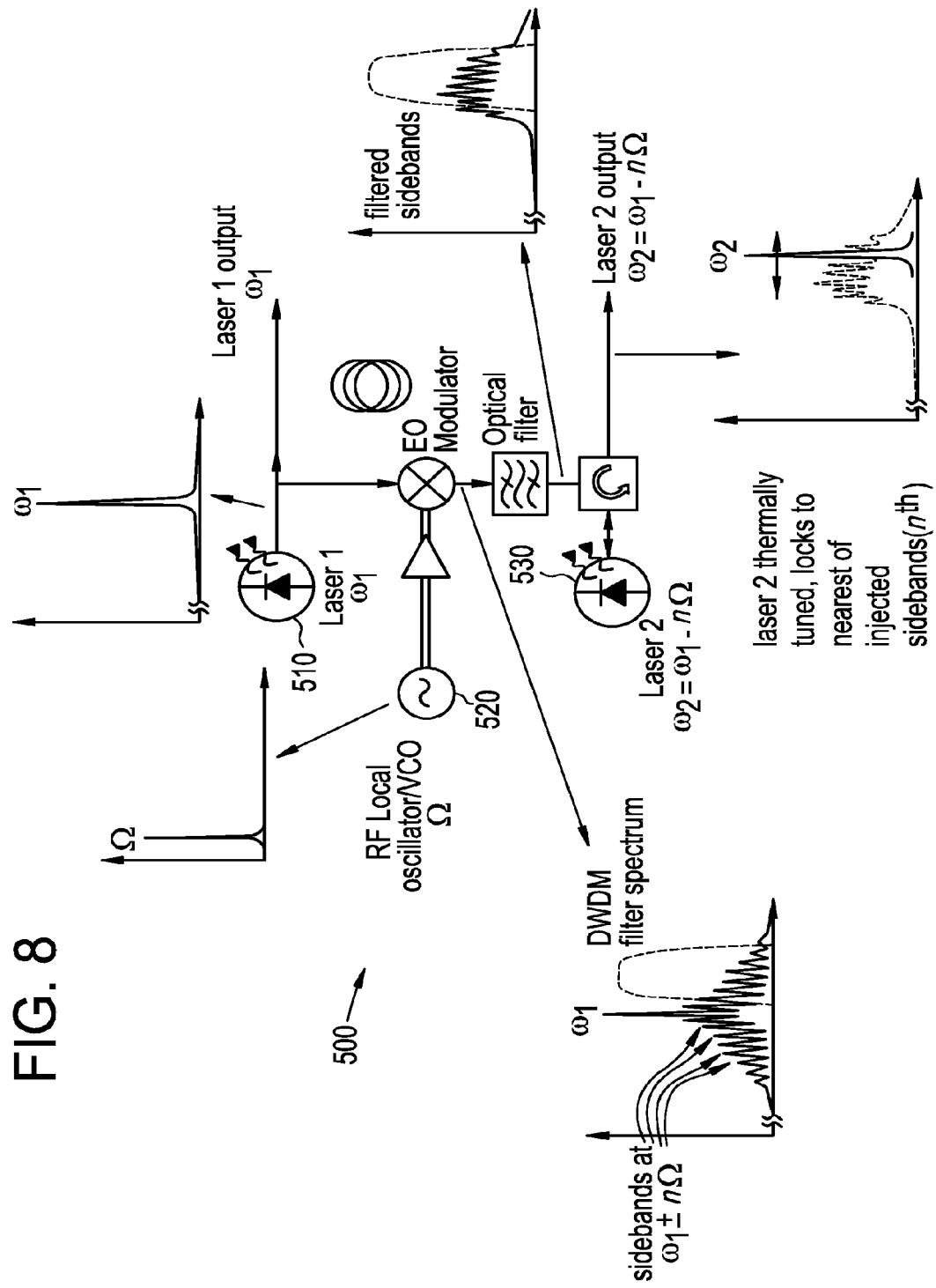
FIG. 8 is a block diagram of a single-channel optical reference source for heterodyne detection in accordance with aspects of the invention.

In the case of this test demonstration, the sidebands were detected by beating with a residual of the optical carrier frequency, hence electrical signals were obtained directly at the frequencies of the emitters. An additional aspect of some embodiments, as illustrated in FIG. 8, is the use of a coherent optical local oscillator (LO) for converting the sideband energy to a more accessible intermediate frequency (IF). This heterodyne technique allows the detection of signals over a widely tunable frequency range, and also eases the bandwidth required of detectors such as photodiode(s) (for example, photodiodes 194 of FIG. 1). A single (master) laser (510) may be used not only to feed all the modulators in the array, but also to generate the coherent heterodyne optical LOs according to the scheme shown in FIG. 8 and described below. As depicted in FIG. 1, beam-splitters 165 and spatial light modulators (SLMs) 196 may then be used to direct spatially filtered signals from their respective positions in the image plane onto photo-diodes 194 for heterodyne detection. The optical LO generation technology is based on modulation-sideband injection locking of semiconductor lasers, offering enormous bandwidth, superb signal purity via cancellation of optical phase noise, and a minimal size weight and power (SWaP) due to the use of optical fibers and photonic components.

Wide tunability is realized by injection locking using a broad comb of harmonics, all derived from externally modulating Laser 1 (510) with a low-frequency RF reference 520 that has been subject to nonlinear distortion as shown in FIG. 8. The output of Laser 1 is also used as the optical carrier in the description above. Laser 2 (530) is tuned to match and lock to the frequency of any one of the injected harmonics. Choosing higher harmonics allows very high offset frequencies to be obtained, and because the locked lasers have identical phase noise, the purity of the reference is preserved. Continuous fine-tuning is available from a tunable reference, e.g., the voltage controlled oscillator (VCO) 520. This approach has been demonstrated to provide for continuous tuning over at least 7 octaves (0.5-110 GHz), with a measured linewidth of ~1 Hz over that entire range. This approach enables continuous tuning up to and exceeding 300 GHz by use of improved modulator technology.

Notably, the photo-diode for RF signal recovery, broadband photodiodes 194 in FIG. 1, need only possess sufficient speed for the intermediate frequency plus the signal bandwidth, not the RF carrier frequency, so the tuning range of the receiver is not photo-diode limited, and can extend to the full range of the modulator's operation. This feature allows use of photodiodes with higher optical power handling and output photocurrents. Using such photodiodes in this architecture allows signals to be received with net gain, and with spur-free dynamic range (SFDR) in excess of 120 dB $Hz^{2/3}$. Note that this estimate does not include the improved dynamic range afforded by spatial filtering as described above.

The foregoing is illustrative of exemplary embodiments and is not to be construed as limiting thereof. Although a few exemplary embodiments have been described, those skilled in the art will readily appreciate that many modifications are possible without materially departing from the novel teachings and advantages of the inventive concepts. Accordingly, all such modifications are intended to be included within the scope of the present invention as defined in the claims.

What is claimed is:

1. A method of RF signal processing comprising:
receiving an incoming RF signal at each of a plurality of antenna elements that are arranged in a first pattern;
modulating the received RF signals from each of the plurality of antenna elements onto an optical carrier to generate a plurality of modulated signals, each modulated signal having at least one sideband;
directing each of the plurality of modulated signals along a corresponding one of a plurality of optical channels, each of the plurality of optical channels having an output, the outputs of the plurality of optical channels arranged in a second pattern corresponding to the first pattern;
forming a composite optical signal using light emanating from the outputs of the plurality of optical channels; and
extracting, from the composite optical signal, a first OFDM signal contained in at least one of the received RF signals.

2. The method of claim 1, further comprising forming an image based on the received RF signals.

3. The method of claim 1, wherein the outputs of the plurality of optical channels emanate light to a free space.

4. The method of claim 1, further comprising isolating a sideband of each of the modulated signals.

5. The method of claim 1, wherein the extracting step comprises directing the composite signal onto a cueing detector to identify the spatial position of the first OFDM signal within the composite optical signal.

6. The method of claim 1, wherein the extracting step comprises directing only a portion of the composite signal onto a signal detector and heterodyning it with an optical reference signal.

7. The method of claim 1, wherein the extracting step comprises identifying a first spatial position of the first OFDM signal within an image plane of the composite optical signal and identifying a second spatial position of a second OFDM signal within the image plane of the composite optical signal, the second spatial position being spaced apart from the first spatial position, and receiving the first OFDM signal with a first signal detector that does not receive the second OFDM signal and receiving the second OFDM signal with a second signal detector that does not receive the first OFDM signal.

8. The method of claim 7, further comprising directing the first OFDM signal onto the first signal detector with a first spatial light modulator in response to identifying the first spatial position and directing the second OFDM signal onto the second signal detector with a second spatial light modulator in response to identifying the second spatial position.

9. The method of claim 1, further comprising compensating for a phase shift in at least one RF modulated optical signal.

10. The method of claim 9, wherein compensating for a phase shift comprises adjusting an electro-optic modulator.

11. The method of claim 1, wherein the first OFDM signal is a frequency-division multiplexed signal comprising multiple carrier signals that are orthogonal to each other.

12. The method of claim 1, further comprising demodulating the first OFDM signal to extract digital data.

13. The method of claim 1, wherein the first OFDM signal comprises multiple channels of data.

14. The method of claim 1,
wherein receiving comprises simultaneously receiving the first OFDM signal and the second OFDM signal by the plurality of antenna elements, and
wherein the extracting step comprises extracting the second OFDM signal from the composite optical signal.

15. The method of claim 14, wherein the first OFDM signal and the second OFDM signal include at least one RF carrier having the same frequency.

16. The method of claim 14, wherein extracting comprises spatially filtering the composite optical signal to separately detect the first OFDM signal with a first detector that does not receive the second OFDM signal and detect the second OFDM signal with a second detector that does not receive the first OFDM signal.

17. An RF receiver comprising:
a phased-array antenna including a plurality of antenna elements arranged in a first pattern configured to receive RF signals from at least one source;
a plurality of electro-optic modulators corresponding to the plurality of antenna elements, each modulator configured to modulate an optical carrier with a received RF signal to generate a plurality of modulated optical signals;
a plurality of optical channels configured to carry the plurality of modulated optical signals, each of the plurality of optical channels having an output to emanate the corresponding modulated optical signal out of the corresponding optical channel, the outputs of the plurality of optical channels arranged in a second pattern corresponding to the first pattern;
a composite signal channel, adjacent to the plurality of outputs of the plurality of optical channels, configured to receive the plurality of modulated optical signals to form a composite optical signal; and
a first detector configured to receive at least a portion of the composite optical signal and to extract a first OFDM signal from the composite optical signal.

18. The RF receiver of claim 17, further comprising a filter configured to isolate a sideband from at least one modulated optical signal.

19. The RF receiver of claim 18, wherein the filter is located within the composite signal channel.

20. The RF receiver of claim 17, wherein the composite signal channel comprises a free space adjacent the outputs of the plurality of optical channels.

21. The RF receiver of claim 17, further comprising a second detector is configured to identify a first signal position of the first OFDM signal within the composite optical signal.

22. The RF receiver of claim 21, wherein the at least one source comprises a first RF source and the first signal position correlates with a spatial position of the first RF source.

23. The RF receiver of claim 21, wherein the first detector is further configured to extract the first OFDM signal within the composite optical signal based on the identified first signal position.

24. The RF receiver of claim 17, further comprising a phase compensation detector configured to compensate for phase shifts in the modulated optical signals.

25. The RF receiver of claim 21, wherein the second detector is configured to receive the composite optical signal to identify spatial positions within the composite optical signal of a plurality of spatially separate information bearing signals, including the first OFDM signal, each identified spatial position corresponding to a spatial position of a corresponding RF source.

26. The RF receiver of claim 17, further comprising:
a second detector configured to receive at least a portion of the composite optical signal and to extract a second OFDM signal from the composite optical signal.

* * * * *